United States Patent Office
3,401,008
Patented Sept. 10, 1968

3,401,008
PREPARATION OF THE CARBONATES OF
THE RARE EARTHS
Earl L. Head, Los Alamos, N. Mex., assignor to the United States of America as represented by the United States Atomic Energy Commission
No Drawing. Filed Sept. 27, 1965, Ser. No. 490,750
6 Claims. (Cl. 23—23)

ABSTRACT OF THE DISCLOSURE

An improved process for the preparation of rare earth carbonates by the application of carbon dioxide pressure to aqueous solutions of the formates, acetates, propionates and butyrates at or above room temperature with an extended reaction period.

The invention described herein was made in the course of, or under, a contract with the U.S. Atomic Energy Commission.

This invention deals with an improved process for the preparation of the rare earth carbonates and, in particular, with a process which permits the preparation of sesquicarbonates of all the rare earths and yttrium by the application of carbon dioxide pressure to aqueous solutions of the formates, acetates, propionates, and butyrates of the rare earths at or near room temperature.

Heretofore, a method for the preparation of the rare earth carbonates from their trichloroacetates was found to exhibit several inadequacies: it did not permit the preparation of the normal carbonate of scandium; the yields and purity of some of the heavier element compounds were low; combustion analysis for the trichloroacetate impurity led to uncertain decomposition products; in the case of ytterbium, about two-thirds of the preparations resulted in an isotropic material deficient in carbon dioxide; and the cost of trichloroacetic acid with its subsequent destruction in the process was not favorable from an economic point of view.

Because of the relative recency of the availability of pure rare earths in quantity, the current use of these elements is rather limited but increasing steadily. Costs of production are generally cited as the reason and these stem from the difficulty of separating the individual elements from one another. Some of the results observed during the development of the method of their invention indicate its use as a separation procedure either for groups of elements or in some cases for individual element separation. The method of this invention exhibits unusual versatility in that manipulation of a number of controllable variables subtle changes are induced in the reaction system to provide either favorable or adverse conditions for the precipitation of the various rare earth carbonates. Furthermore, because of the stability of the carbonates of the rare earths they are useful as shelf reagents and are particularly useful as a method for adjusting the hydrogen ion concentration (pH) or the rare earth concentration within the solution. Further uses involve the synthesis or organometallic compounds in which the carbonates provide a direct method of reaction with weak organic acids without the introduction of undesirable cations. This method is particularly suited for the preparation of the carbonates of yttrium, gadolinium, and europium.

The inventor has discovered that the rare earth carbonates with the exception of scandium can be prepared from the rare earth salts of several organic acids. Specifically, dissolution of the acetates and propionates in water with the subsequent application of carbon dioxide pressure produces the normal sesquicarbonates. Although this method will produce the carbonates at room temperature the inventor has found that elevated temperatures help to increase yield, particle size, reaction rate, and filterability of the product.

It is an object of this invention to provide a process for the production of rare earth carbonates from their corresponding formates, acetates, propionates, and butyrates at or near room temperature.

It is another object of this invention to provide a process for the production of rare earth carbonates whereby elevated temperatures are used to increase product yield.

Other objects of this invention will become apparent from the following description of the invention.

A preferred embodiment of the invention is as follows: 10 grams of the organic acid salt of the rare earth is dissolved in 300 milliliters of distilled water. The beaker containing the solution is placed in a pressure reactor which is flushed once with carbon dioxide and then pressured with carbon dioxide to 800 pounds per square inch. The reaction system is maintained at a temperature of 50–55° C. for about 12 hours. Stirring of the solution during the run is accomplished by means of a Teflon-covered, magnetic stirring bar. Upon removal from the pressure reactor, the product is filtered, washed with water, acetone, and ether, and left exposed to the atmosphere to rid the carbonate of any residual ether that may remain trapped in the carbonate particles.

Although the preferred embodiment just described produces maximum yields of the desired rare earth carbonate, the process will work over a broad range of temperatures, $CO_2$ pressures, and reaction periods. For example, the carbonate obtained from lutetium acetate (Table I) was produced after a reaction period of 3 hours at a carbon dioxide pressure of 200 p.s.i., and a temperature of 55° C. In addition, all the rare earths carbonates can be made at room temperature (23° C.) using the same method outlined in the preferred embodiment but with lower yields. The inventor has discovered that the useful parameters of this invention are as follows:

Carbon dioxide pressure _____p.s.i.___ 200–800
Temperature of solution _____° C.___ 23–65
Reaction periods _____hours___ 4–15

$CO_2$ pressures are critical only for the lower limit, while temperatures much above 55° C. caused the carbonate to decompose, and below 23° C. the reaction rate is too slow. Reaction periods were not especially critical except for greatly extended periods. An example of over extended reaction period was the preparation of the carbonate from gadolinium acetate in which the reaction time was extended to 120 hours. As seen from Table I, this extended reaction period did not improve the quality or quantity of the product and may have contributed to a slight increase in the contamination of the said carbonate product.

Data relating to the carbonate products prepared by the method of this invention are given for the acetate and propionate series in Tables I and II respectively. The molar ratios of $CO_2$ to lanthanon sesquioxide, $Ln_2O_3$, and $H_2O$ to $Ln_2O_3$ and the percent composition data are obtained from oxygen combustion data. The percent composition value is obtained by the addition of the percentages of the sample weight for the three observed combustion products, i.e., oxide, $CO_2$, and $H_2O$. This value includes the weight of $CO_2$ and $H_2O$ resulting from the oxidation of any organic material present in the sample. The amount by which this value exceeds 100.00% is a measure of the organic material present in the product. The pH value represents the measured pH of the aqueous solution of the organic acid salt prior to its being placed in the bomb. The percent yield is obtained by determining the total amount of oxide equivalent contained in the carbonate product in relation to the total amount of oxide equivalent contained in the original sample of organic acid salt placed in solution.

No exhaustive effort was made to obtain neutral salts free of excess acid; consequently, the pH values in the tables result from salts slightly deficient in acid groups in some cases and from salts containing a slight excess of acid in other cases. The presence of excess acid lowers the pH of the solution and, consequently, the yield of the carbonate product. With increasing atomic number of the rare earth element the trend in both the acetate and propionate series is toward a lower pH for aqueous solutions of the organic acid salts. The pH of a particular rare earth propionate solution is generally higher than that of its analogous acetate solution, and possibly as a consequence of this the product yields from the propionates are generally higher than those obtained from the acetate.

TABLE I.—DATA FOR THE CARBONATES PREPARED FROM THE ACETATES

| Element | Molar ratios | | Additive, percent composition (oxide+$CO_2$+$H_2O$) | pH | Percent Yield |
|---|---|---|---|---|---|
| | $CO_2/Ln_2O_3$ | $H_2O/Ln_2O_3$ | | | |
| La | 3.26 | 7.47 | 100.19 | 7.1 | 51.0 |
| Ce | 3.05 | 7.89 | 100.06 | 4.5 | 39.9 |
| Pr | 3.04 | 7.93 | 100.05 | 6.3 | 29.8 |
| Nd | 3.06 | 2.63 | 101.12 | 6.5 | 45.1 |
| Sm | 3.12 | 2.78 | 101.11 | 6.7 | 37.2 |
| Eu | 3.11 | 2.85 | 101.22 | 6.5 | 49.1 |
| Gd | 3.15 | 2.85 | 101.31 | 6.7 | 47.7 |
| Tb | 3.05 | 3.06 | 100.62 | 6.6 | 50.8 |
| Dy | 3.09 | 2.88 | 101.00 | 5.5 | 37.6 |
| Ho | 3.05 | 2.98 | 100.60 | 5.1 | 24.9 |
| Er | 3.06 | 2.88 | 100.68 | 6.3 | 64.6 |
| Er * | 3.12 | 7.06 | 100.63 | 4.6 | |
| Er ** | 3.17 | 6.96 | 100.33 | 4.2 | |
| Tm | 2.98 | 2.83 | 100.65 | 6.0 | 28.7 |
| Yb | 3.02 | 5.34 | 100.29 | 6.2 | 40.6 |
| Lu | 3.00 | 5.85 | 100.16 | 5.5 | 18.6 |
| Y | 3.09 | 3.01 | 101.09 | 6.3 | 71.1 |

TABLE II.—DATA FOR THE CARBONATES PREPARED FROM THE PROPIONATES

| Element | Molar ratios | | Additive, percent composition (oxide+$CO_2$+$H_2O$) | pH | Percent Yield |
|---|---|---|---|---|---|
| | $CO_2/Ln_2O_3$ | $H_2O/Ln_2O_3$ | | | |
| La | 3.05 | 8.00 | 100.15 | 7.9 | 52.1 |
| Ce | 3.03 | 7.89 | 99.94 | 6.4 | 40.7 |
| Pr | 3.12 | 8.07 | 100.76 | 7.1 | 35.3 |
| Nd | 3.03 | 2.61 | 100.37 | 6.4 | 59.5 |
| Sm | 3.07 | 2.78 | 100.74 | 6.5 | 60.1 |
| Eu | 3.14 | 2.85 | 101.22 | 7.1 | 67.5 |
| Gd | 3.08 | 2.62 | 101.10 | 5.6 | 55.4 |
| Tb | 3.11 | 2.73 | 101.00 | 7.0 | 31.9 |
| Dy | 3.10 | 2.59 | 100.95 | 5.5 | 52.1 |
| Ho | 3.05 | 2.63 | 100.87 | 6.6 | 46.8 |
| Er | 3.06 | 2.67 | 100.81 | 6.3 | 50.1 |
| Tm | 3.04 | 2.46 | 100.41 | 6.2 | 51.7 |
| Yb | 3.03 | 2.76 | 100.39 | 6.4 | 54.7 |
| Lu | 2.90 | 5.23 | 100.20 | 6.3 | 24.0 |
| Y | 3.00 | 2.53 | 100.87 | 6.7 | 49.2 |

In Table I there is an unmarked erbium, this being a lower hydrate of erbium carbonate and is made in the manner described in the preferred embodiment stated above. The second erbium carbonate marked with a single asterisk in Table I is the hepta-hydrated carbonate and is produced by heating a highly concentrated solution of erbium acetate for only 2 hours at 50° C. and under a carbon dioxide pressure of 880 pounds per square inch. This same hepta-hydrate (see Table I erbium**) may be also obtained under the same conditions as described with Er* except that the period of reaction must be extended to a period of about 12 hours and be done at room temperature (23° C.).

In summation, this method permits the preparation of relatively pure carbonates in yields ranging in the vicinity of 50–60% theoretical and generally the method exhibits the following advantages:

(1) The carbonates are formed under conditions of gradually decreasing pH whereby tendencies toward basic carbonate formations are minimized.

(2) Controlled conditions are possible with these procedures which were not possible with the simpler direct precipitation methods.

(3) Because of the absence of inorganic anions and foreign cations, the total composition of the carbonate product can be determined from a single combustion analysis.

(4) The carbonates can be prepared at temperatures low enough to permit isolation of higher hydrates of the heavier elements.

(5) The method is economical due to the simplicity of the reagents and conditions employed.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. A method of preparing rare earth carbonates comprising the steps of dissolving an organic acid salt of the desired rare earth in water, said salt being selected from the group consisting of formates, acetates, propionates and butyrates, placing the resulting solution in a pressure reactor, introducing $CO_2$ into said reactor, maintaining a $CO_2$ pressure of 200 to 800 p.s.i. and a temperature of 23 to 65° C. for a period of 4 to 15 hours to precipitate the rare earth carbonate, and recovering said carbonate.

2. The method of claim 1 in which said organic salt is a rare earth acetate.

3. The method of claim 1 in which said organic acid salt is a propionate of the rare earth.

4. The method of claim 1 in which the temperature is elevated to the range of 50–55° C.

5. The method of claim 1 in which the said reactor is pressured with carbon dioxide in the range of 700–800 pounds per square inch.

6. The method of claim 1 in which the said period is 12 hours.

References Cited

UNITED STATES PATENTS 2,872,287  2/1959  Duffield et al. _____ 23—61 X
2,872,288  2/1959  Duffield et al. _____ 23—61 X
3,153,571  10/1964  Bronaugh _____ 23—22

OSCAR R. VERTIZ, *Primary Examiner.*

H. T. CARTER, *Assistant Examiner.*